Figure 1:
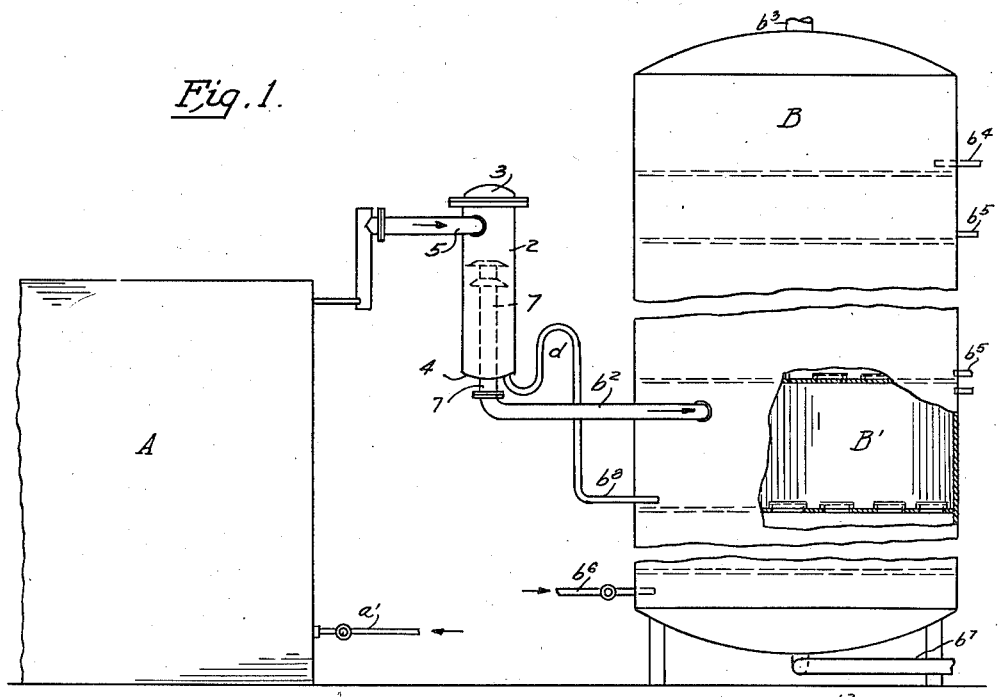

Nov. 3, 1936.　　　C. G. HAWLEY　　　2,059,522
PETROLEUM REFINEMENT AND THE LIKE
Filed June 13, 1933　　　5 Sheets-Sheet 1

INVENTOR
Charles G. Hawley
BY Mason & Mason
ATTORNEYS

Nov. 3, 1936.  C. G. HAWLEY  2,059,522

PETROLEUM REFINEMENT AND THE LIKE

Filed June 13, 1933  5 Sheets-Sheet 2

INVENTOR
Charles G. Hawley.
BY Mason & Mason
ATTORNEYS

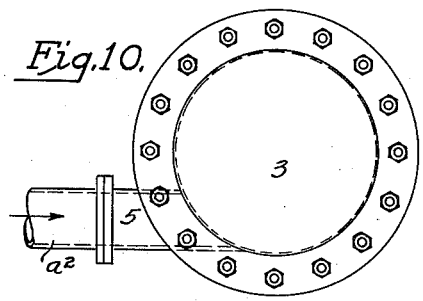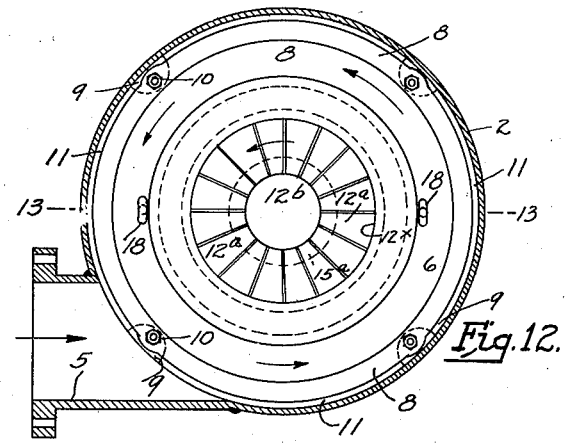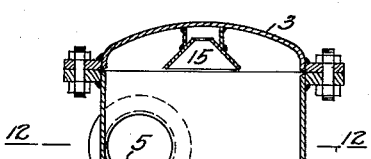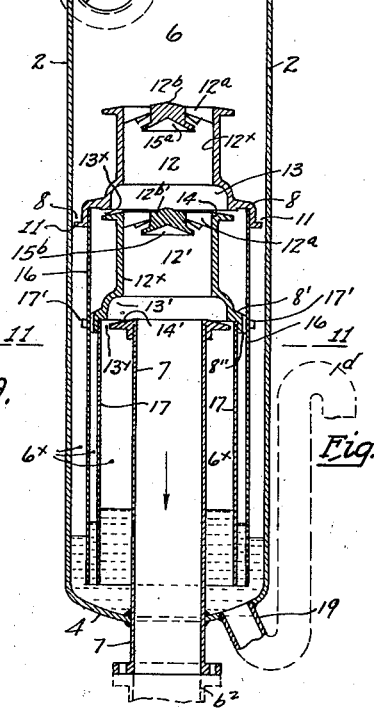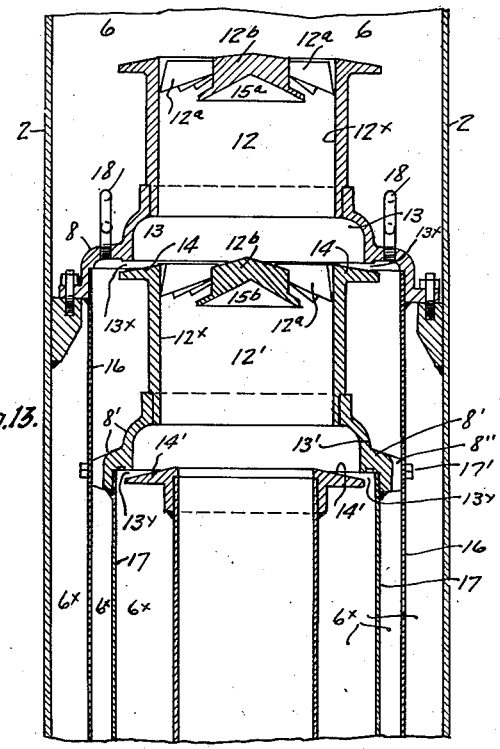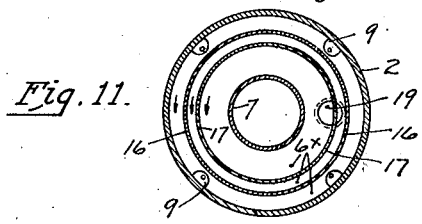

Nov. 3, 1936.  C. G. HAWLEY  2,059,522
PETROLEUM REFINEMENT AND THE LIKE
Filed June 13, 1933   5 Sheets-Sheet 4
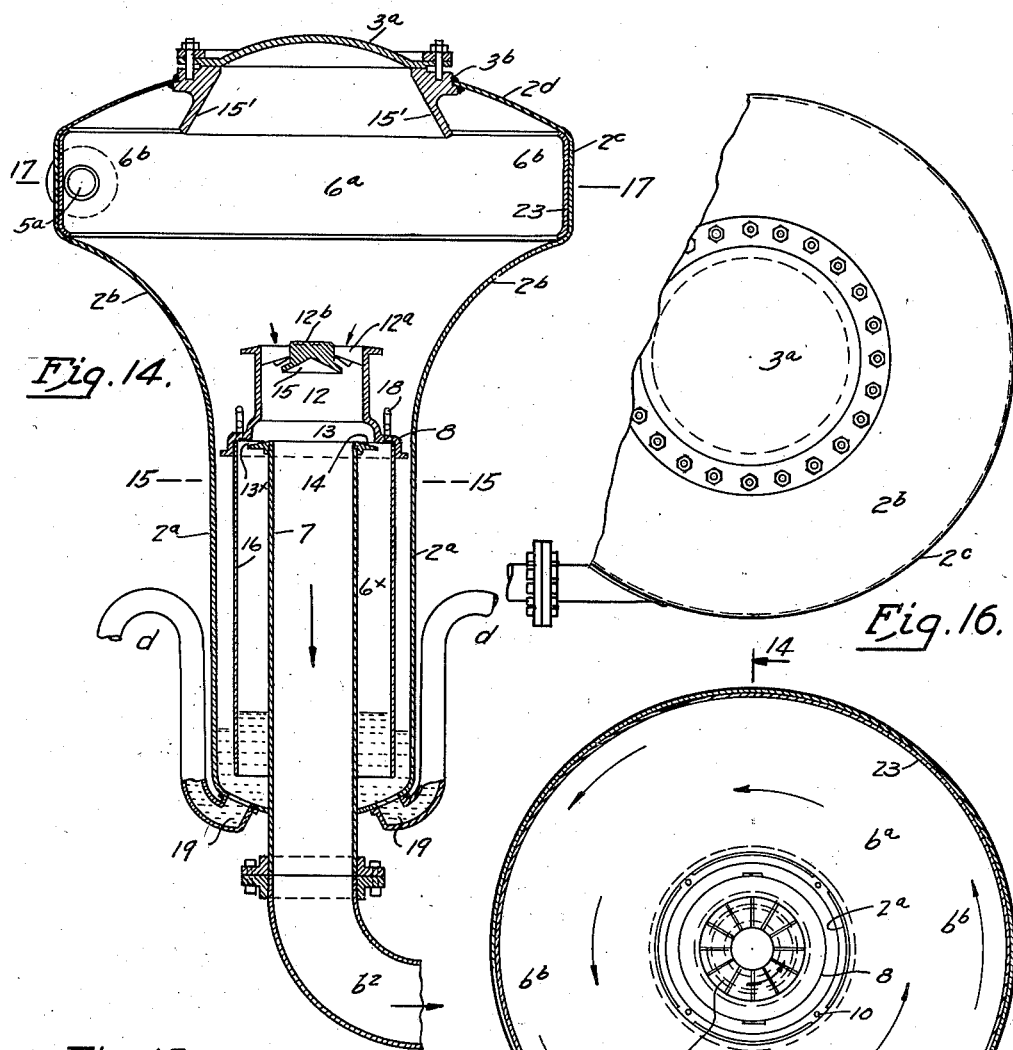
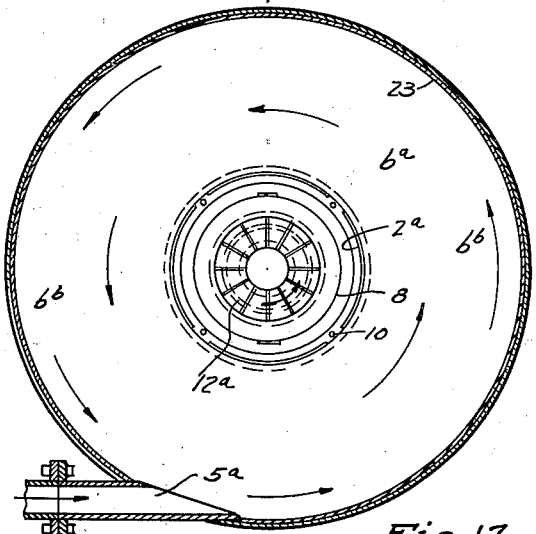
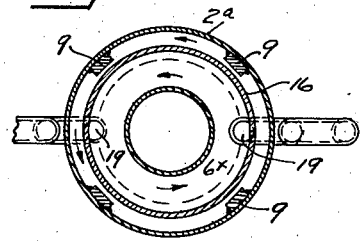
INVENTOR
Charles. G. Hawley
BY Mason & Mason
ATTORNEYS Nov. 3, 1936.  C. G. HAWLEY  2,059,522
PETROLEUM REFINEMENT AND THE LIKE
Filed June 13, 1933   5 Sheets-Sheet 5
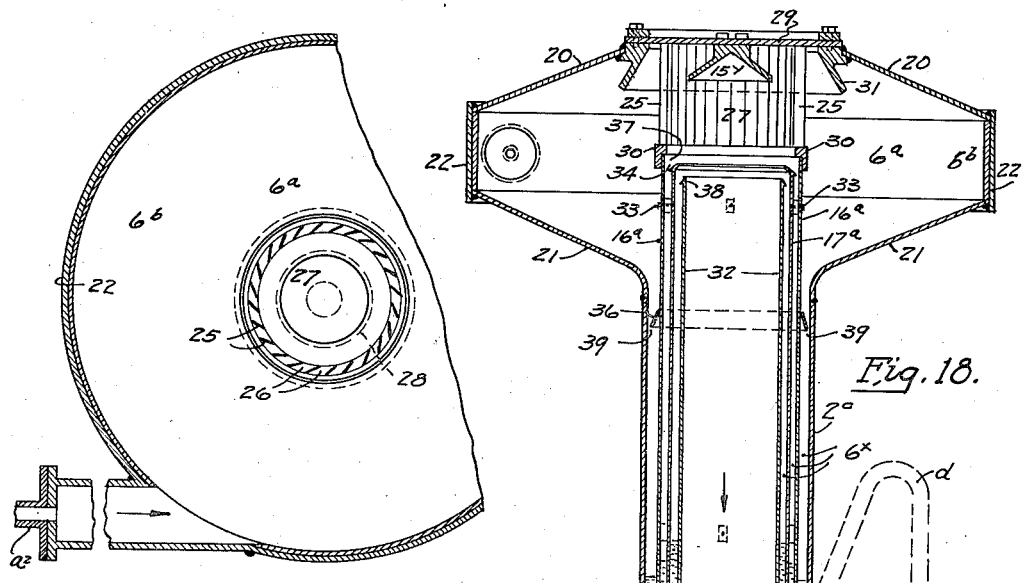
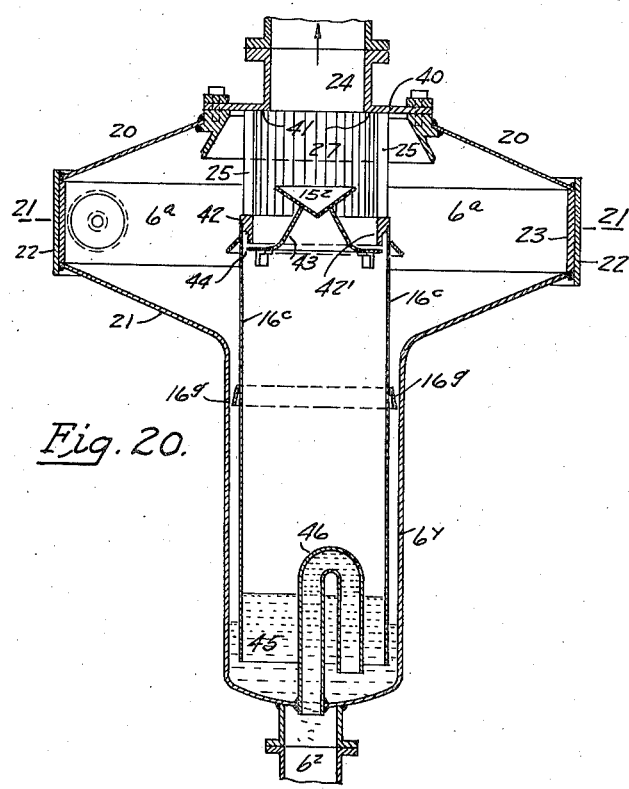
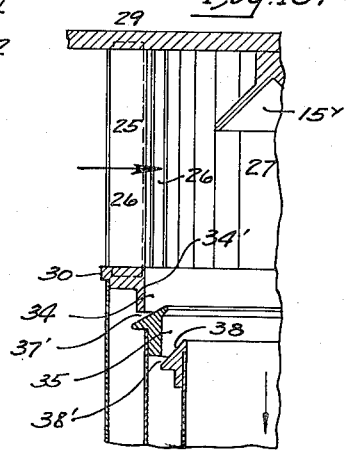
INVENTOR
Charles G. Hawley
BY Mason & Mason
ATTORNEYS Patented Nov. 3, 1936

2,059,522

UNITED STATES PATENT OFFICE 2,059,522

PETROLEUM REFINEMENT AND THE LIKE

Charles Gilbert Hawley, Chicago, Ill., assignor to Centrifix Corporation, Cleveland, Ohio, a corporation of Ohio Application June 13, 1933, Serial No. 675,635

1 Claim. (Cl. 196—93)

This invention relates to improvements in the art of distilling and refining liquids. While capable of many uses, the invention will be most completely understood if explained in its application in and to the difficult art of petroleum refinement, including distillation and fractionation. Therefore this specification will be mainly directed to a description of the invention in that aspect and only brief mention will be made concerning other possible uses of the novel process and apparatus.

As is well known, it is difficult to produce even pure distilled water in large volumes. Difficulty of refinement is accentuated in the case of petroleum and its products, the crude oils being of varying make-up and the products tending to be variable, of uncertain quality and so colored as to necessitate expensive after-treatments, before they can be said to be suitable for sale.

The special purpose of this invention is to produce distilled petroleum products of superior quality, upon a large scale, at minimum expense, and continuously, using apparatus of reasonably low cost, of self-cleaning character and easily maintained.

The invention includes both process and apparatus, each being necessary to the other.

It is generally admitted that several of the known faults of present day products of distillation and of fractionation result directly from the treatment of vapors which contain unvaporized liquids, often including solids. Such impurities prevent the easy production of clean cut products, of desired constitution and color.

Much has been done toward purifying the vapors in advance of their conversion into desired distillates. But though present methods and apparatus are generally regarded as being quite perfect, it is evident that much remains to be done, for otherwise there would be less need of corrective treatment of the products taken from fractionating towers and the like. The object and effect of this invention is to accomplish the substantially complete purification of vapors immediately upon release from the still and immediately in advance of their fractionation or conversion into liquid fractions, to the end that the process of obtaining desired distillates shall be simplified, and, to the end that the cost of corrective after-treatments of the fractions shall be reduced and in some cases eliminated.

If in a pure state, hot vapors derived from a still yield uniformly to different stages of treatment in a fractionating column but impure vapors perform uncertainly and make the production of commercially pure fractions difficult and expensive. Any impurities contained by hot petroleum vapor not only increase the costs of the products in general but very definitely resist the sure attainment of desired equilibrium points at the different levels in the fractionating column, thus directly increasing the work of the refiner.

The faults with which this invention is concerned arise from the fact that it is neither practicable nor desirable to convert into vapor the whole of any crude or starting product. Thus the hot product of the still is always composed of a mixture of hot liquid and hot vapor, the proportions varying with the character of the process employed.

The expected degree of vaporization may be attained either in the upper part of the still or during the passage of its product from still to column. Or the expected degree of vaporization may wait upon the liberation of the hot products within the lower part of the fractionating column. In no case does all of the hot liquid become vapor. There is always a residue of liquid not vaporized or vaporizable at the ruling temperatures; and the problem is to completely separate the unvaporized portions and to withhold them, thus permitting only the pure vapor to rise within the fractionating column.

In the case of a so-called atmospheric operation, the product leaving the still and entering the fractionating tower is composed chiefly of vapor, the usual proportion being eighty percent vapor and twenty percent of liquid. Obviously, the proportion may vary within a considerable range, either more or less than stated. In contrast, vacuum operations as a rule are characterized by the delivery of a larger proportion of liquid to the fractionating tower, accompanied by a minor part of vapor; the quick liberation and flashing of the hot liquid within the large tower being relied upon to accomplish the vaporization in greater part.

The vapors developed, whether pure or impure, rise through successive compartments of the fractionating tower, usually countercurrent to a flow of reflux liquid, and various fractions or distillates are taken off at different levels of the tower. Obviously, the purity of such products is dependent upon the purity of the vapors from which they are derived.

In both vacuum and atmospheric operations and by reason of the relatively great size of the tower or column the vapors move upward but slowly and the heavier substances, entering or liberated within the tower, are precipitated by gravity. The settled liquid residue is usually subjected to a stripping operation employing steam within the lower part of the tower and the minor quantity of vapor derived therefrom rises to join the other vapors in the tower, leaving only a residual tar to be withdrawn from the bottom of the tower.

With few exceptions, the described liberation of the hot liquids and vapors within the tower has been depended upon to reduce the velocity of the off-going vapors and thus to permit of the gravity separation or precipitation of the unvaporized constituents before the vapor rises into the upper reaches of the tower. But that method of clarifying the vapor in preparation for fractionation, while effective in ridding it of heavy drops and particles, is not effective to the extent of excluding minute particles of liquid and minute solids from the rising vapor; and failure in that regard necessitates the present practice and expense of extensive after-treatments of the products taken from the tower. For want of a cure, the refining industry in general has accepted such work and expense as matter of course, the same having come to be regarded as proper and unavoidable.

It has been ascertained that in most cases all but two to three percent of entrained liquid is precipitated in the reception space of a fractionating column. But as observed throughout the refining industry, the lighter products or fractions are imperfect still and must be further refined, at added expense. Such imperfection is directly caused by the inclusion of the very small percentage of non-precipitated liquids and solids, which small percentage interferes with the subsequent process of fractionation and compels the further refinement of the fractions before they can be marketed for use.

Some attempts have been made to perform or perfect the separation of the unvaporized substances by means positioned in the streamline between the still or generator and tower. But the devices employed proved to be less effective than the described expansion space within the tower itself; and developed also a clogging character, which curtailed performance. The upper parts of some expansion or reception spaces are provided with an arrangement of baffles intended to intercept entrainment, which results in a slight improvement but not enough to reduce the entrainment below the two or three percent, which as pointed out, occasions the trouble under conditions employing the best of present tower constructions. This small residue or quantity of entrained liquid must be pointed out as the immediate cause of some operating difficulties and of the expensive after-treatments of the products.

The heavy initial burdening of the vapor, because easily cured, is actually of less moment than the persistent presence of a relatively small but widely diffused quantity of very minute liquid and solid particles doubtless colloidal in size; and which resist sedimentation and remain in suspension within the rising vapors. Obviously, therefore, any real improvement upon the present art of refining petroleum must attain to the exclusion of these minute particles.

Briefly, the present invention consists in eliminating practically all unvaporized substances from the complex vapor before it is permitted to enter the fractionating column, interchanger, or condenser. Thus the subsequent process of obtaining the desired liquid products is limited to the treatment of substantially uniform and pure vapors, affording advantages obvious to all skilled in the art.

Assuredly, I am not the first to entertain the hope of accomplishing a virtually complete clarification of petroleum and like vapors prior to their utilization and may not be the first to comprehend the extent of the benefits to be derived from so doing. But on the other hand, I appear to be the first to perceive the true difficulty and to devise the ways and the means by which the desired results and effects may be secured with certainty, in a continuous process and at costs so low as to insure large savings of effort and money. Certain instances of such savings will be cited hereinafter. The practice of the process and the uses of the apparatus hereof in other arts is usually of less significance in the matter of direct monetary savings, but still comparatively important.

Otherwise stated, the improvement here claimed is of a multi-stage character and consists in excluding from the fractionating compartments of the tower or column, first the readily precipitable liquids and solids and as a next stage, definitely excluding the non-precipitable or difficultly precipitable residue of liquids and solids. Practically, this invention first separates from the vapor stream easily precipitable impurities in quantity substantially corresponding to the gravity precipitation taking place in an ordinary tower or column and thereafter proceeds to the separation of the minute residue of impurities which at present prevent the production of pure distillates in such ordinary tower or column. As a matter of fact a successful process must be divided into stages for I find it necessary to remove the bulk of impurities before the very minute particles can be recovered and removed with certainty.

The term "excluding" as herein used does not mean that the separated liquids are prevented from later entering the fractionating tower, for under this invention the collected impurities may be and usually are safely delivered to the base of the tower, but only in coalesced or liquid form; in which form they can be safely stripped or treated without danger of re-entrainment. In passing, it should be remarked that such delivery of collected liquid is a matter of convenience rather than of necessity. Obviously and perhaps more logically the separated matters may be stripped or otherwise treated in separate apparatus.

The actual work essential to this invention is done by a multiple stage separator in which the force of gravity is but incidentally employed and the great merit of which rests upon the fact that it is capable of purifying vapor by stages and in substantially perfect degree, yet offers little resistance to the movement of the vapor toward the tower, and collects the rejected material in the form of a hot liquid which may be drained into the base of the tower or otherwise disposed of. This novel multiple stage separator is of self-cleaning character; a matter of great importance, for thus it may be operated continuously; that is, for a great length of time, without coking or otherwise becoming clogged.

Generally speaking, centrifugal force is here substituted for gravity or for mere bafflement, yet this novel separator has no moving parts. Its separating efficiency is attained by subdividing the work to be done, utilizing surfaces and centrifugal forces which increase in effectiveness as the residual masses or particles become finer and finer. First, a centrifugal separation of the bulk of the entrainment is made, the operation taking place at velocities and upon a radius of motion adequate to the purpose. Next, the partially purified vapor is subjected to a centrifugal purifying operation at higher rotative velocity and upon a shorter radius of rotation, whereby the most minute liquid and solid particles are separated from the vapor stream. The purified vapor is then discharged into the fractionating column. Meantime, the liquids that are separated from the vapor stream in the several stages above mentioned, are centrifugally and positively ejected from the path of the stream and are at once collected in a relatively remote body, which body nevertheless remains under restricted propulsion of the whirling vapor until it flows or is discharged from the separator. This last prevents the settlement of solids, the latter being kept in suspension for sure discharge with the liquid, thus explaining the above-mentioned freedom from coking.

As explained, a gravity separation of the impurities cannot be sufficiently completed within the space and time afforded by the low vapor velocities characteristic of the large reception chamber of a fractionating column. In contrast, this invention accomplishes the desired purpose within a small space, at high velocities and by forces which avoid the limitations of gravity and, by preference, external to the tower or column. Nowhere within the art has there been developed any tower or other apparatus capable of continuously extracting virtually colloidal impurities from the vapor stream moving toward the fractionating compartment. Such is the gist of this process and before the process could be practiced I was compelled to invent the herein described apparatus, peculiar thereto, though obviously capable of still other uses.

As evidence of the sufficiently perfect operation of the herein described process and apparatus, the following facts are cited.

Operating upon a large scale, a crude petroleum from east Texas was distilled by passing it through an externally heated pipe still of restricted cross-sectional area, wherein it was raised to a temperature of 800° F. and introducing the resultant mixture of oil and vapors into the reception space or section of a fractionating column maintained at substantially atmospheric pressure. Under these conditions, ninety per cent of the crude was vaporized and passed through the fractionating column counter current to reflux liquid. The unvaporized products were withdrawn from the bottom of the column. From various levels in the column, liquid streams of varying volatility and viscosity were removed. The highest boiling distillate fraction i. e., the one just above the oil-vapor inlet, had a Saybolt viscosity of 140 seconds at 210° F. On an additive color scale (see Industrial and Engineering Chemistry, 22, 1293–1930) the viscous distillate fraction next above referred to, comprising 6% of the crude, contained 11,900 color units. In sharp contrast, when the same crude oil was distilled in the same manner, but using the herein described process and apparatus, the same viscous distillate fraction contained only 1650 color units, a reduction of approximately 85% of the color content.

The color reduction was due to the substantially complete removal of the unvaporized portion of the oil from the vapors prior to the introduction of the latter into the fractionating column, thus preventing contamination of the distillate with the unvaporized substances.

In another case, but upon the same large scale, a less intensely colored crude oil was similarly distilled to 6% bottoms, both with and without the aid of the herein described improvements. The color content of the unvaporized portion was normally 33,000 units and without these improvements the viscous fraction contained 5,800 color units, while the same fraction when produced by the present process contained only 1,550 color units.

When the viscous fractions were treated with sulfuric acid to reduce the color content of each of them to 150 units (for comparison), it was found that with the fractions produced by this invention only 38 lbs. of 66° Bé. acid were required per 50-gallon barrel, whereas, for the same fractions from the normal or ordinary operation which did not involve the use of this invention 85 lbs. of 66° acid were required.

Obviously, therefore, this invention effects a material saving in refining costs. As will be apparent, further savings are effected in the daily operation of the refinery.

While a vapor reception space should be provided in every tower or column, it now becomes evident that such spaces do not accomplish all the work and results to be desired, and that some of the reasons for the use of that space must be revised. There is every indication that the present invention will bring about a change of tower design and practice, through permitting the restriction of the size of the vapor reception space, with obvious economy in tower construction.

The novel process and the character of the apparatus requisite to its performance being now understood, attention is next directed to the detailed construction of the preferred apparatus illustrated in the accompanying drawings. And in connection therewith there will be described a further or extended step of this process which is peculiar to the distillation and fractionation of complex liquids under conditions which present a large difference of pressure between the outlet of the still and the tower, as is typical of vacuum operations. The drawings also depict several exemplary forms of the novel apparatus, as required to suit different purposes and uses.

Figure 2:
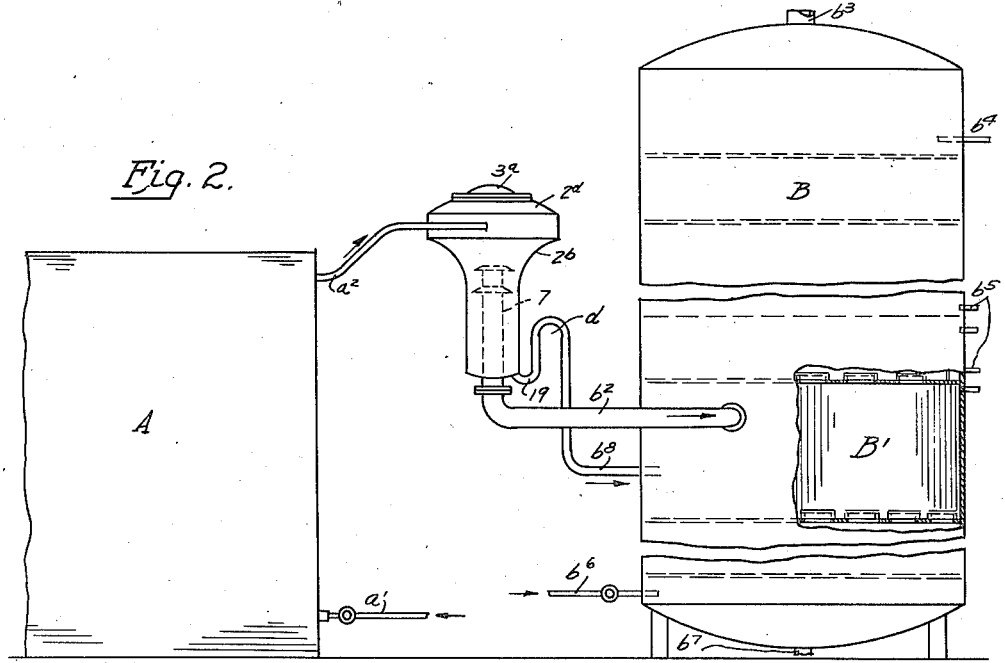
Figure 3:
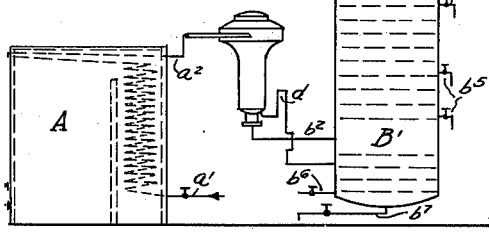
Figure 8:
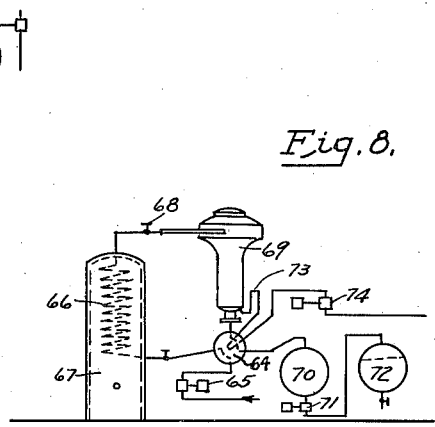
Figure 4:
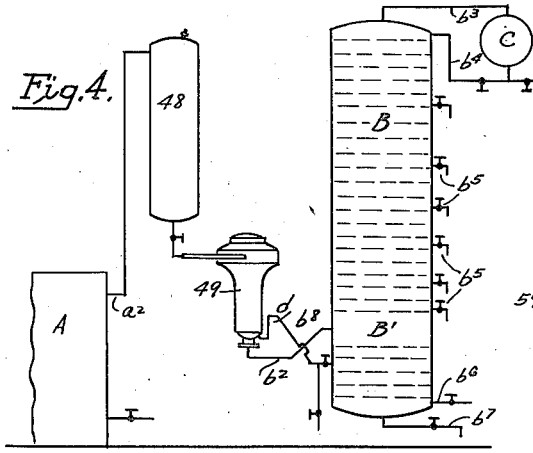
Figure 7:
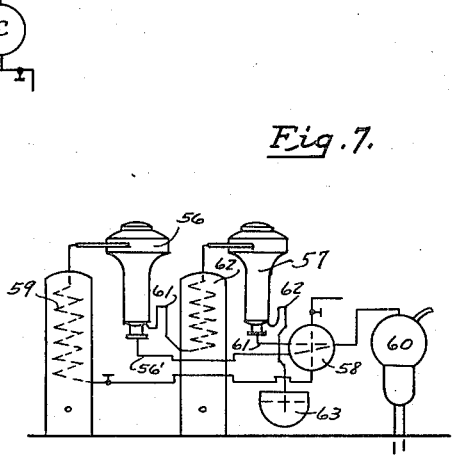
Figure 5:
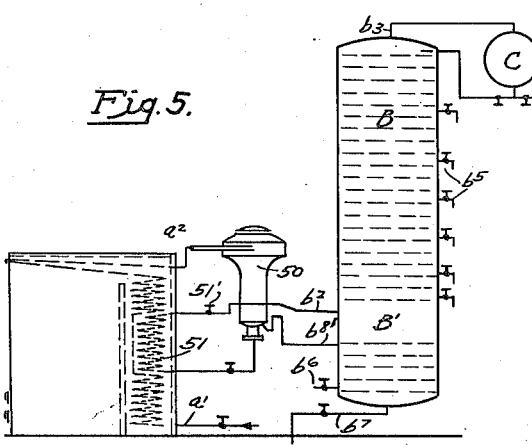
Figure 6:
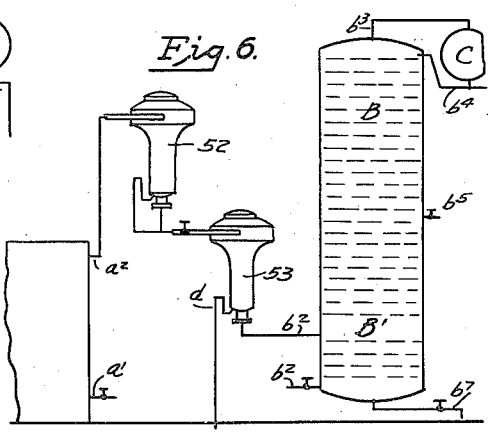

In said drawings, Fig. 1 is a diagrammatic elevation illustrating a petroleum still and an atmospheric fractionating tower, together with the novel vapor purifying or refining apparatus which I provide between still and tower; Fig. 2 is a like illustration but depicting a vacuum fractionating tower together with apparatus of a modified form which is best adapted thereto; Fig. 3 is a more extended diagrammatic illustration of the apparatus depicted in Fig. 2; Fig. 4 illustrates the manner in which the invention is practiced in the case of a petroleum "cracking" process; Fig. 5 illustrates another method of practicing the invention in a cracking process; Fig. 6 may be compared with Fig. 4, being of like utility; Fig. 7 diagrammatically represents my method of practicing the process in the production of syrup and the like; Fig. 8 illustrates the use of the invention in the distillation of salt water and the like; Fig. 9 is a vertical cross section of the vapor purifier diagrammatically illustrated in Fig. 1; Fig. 10 is a top view thereof; Fig. 11 is a horizontal section on the line 11—11 of Fig. 9; Fig. 12 is an enlarged cross section on the line 12—12 of Fig. 9; Fig. 13 is a fragmentary vertical section on the line 13—13 of Fig. 12; Fig. 14 is an enlarged vertical section of the vapor purifier diagrammatically illustrated in Fig. 2; Fig. 15 is a cross section on the line 15—15 of Fig. 14; Fig. 16 is a fragmentary top view of the purifier shown in Fig. 14; Fig. 17 is a horizontal section on the line 17—17 of Fig. 14; Fig. 18 is a vertical section of a purifier of the down flow type suitable for use in place of the forms shown in Figs. 9 and 14; Fig. 19 is an enlarged fragmentary section taken from Fig. 18 and illustrating the construction of the internal vapor refining element; Fig. 20 is a vertical section illustrating a modified form of the purifier, for comparison with Fig. 18 and characterized by an outlet in its top, instead of at the bottom; and, Fig. 21 is a horizontal section on the line 21—21 of Fig. 20.

Each part marked A in Figs. 1 to 6 conventionally represents a petroleum still, usually of a type which is of restricted cross-sectional area. The parts marked $a'$ represent the valved pipes through which respective stills are supplied with oil under pressure, crude oil as a rule. And the parts marked $a^2$ represent the hot vapor-and-liquid outlets of respective stills. The parts marked B diagrammatically represent conventional fractionating towers or columns, which receive the hot products from the outlets of the fired stills. Every fractionating column or tower is characterized by a large vapor reception space or chamber, marked B', in its lower intermediate part, the same being the expansion chamber before mentioned, which is beneath the fractionating compartments of the tower and above the stripping space or spaces. The vapor enters the space $B^1$ through a pipe $b^2$, which leads from the outlet of the still A, and the ultimate vapor leaves the top of the tower through the pipe $b^3$, which leads to a condenser C. Reflux liquid is supplied to the tower through a connection $b^4$, also at the top; and other connections, such as are marked $b^5$, are provided at different levels for drawing off products or fractions of differing qualities. Steam may be supplied to the base of the tower for the usual stripping operation, as through a valved pipe $b^6$. The valved pipe $b^7$ is the tar or "bottoms" drain at the bottom of the tower. The several parts or devices which appear in the line $a^2$—$b^2$ between the still and tower, complete the open passageway from one to the other and comprise that element of this invention which permits and enables the practice of the described process, being a novel multiple stage centrifugal separator adequate thereto. This paragraph completes the identification of the parts or elements referred to in the foregoing. Attention may now be directed to the particulars of the separator or purifier which is required for the purpose.

The separator or vapor purifier of this invention is preferably made in two types. The first is specially adapted for employment with so-called atmospheric pressure stills and towers, as depicted in Fig. 1; while the second is particularly suited for use as a combined evaporator and vapor purifier; as depicted in Figs. 2, 3, 4 and others. This second type is best suited to vacuum operations, or otherwise where the pressure in the column is very much lower than that which obtains at the outlet of the still; it being necessary that the vapors shall be developed, before they can be purified.

The principle of operation of the separator embodying this invention consists in first making a bulk separation of entrained liquids and solids within an initial or primary separating chamber and then taking control of the moving fluid within smaller compass, as within a passage leading from said chamber, and there, at the relatively high velocities incident to the smaller compass, separating the residue of entrained substances, to the end that the fluid shall be discharged in a substantially pure or unburdened state.

This principle is augmented by the utilization of centrifugal forces that are developed within and from the moving stream of vapor, or other fluid; and further, all these operations are accomplished within an apparatus of comparatively small size, and without resort to moving parts of any kind. Each of the multiple stage separators herein depicted comprises a bulk or primary centrifugal separator and one or more centrifugal separators of smaller working diameter and incorporated therein, said smaller separators forming or representing the outlet of the primary separator. The principle is based on the fact that a rough centrifugal separation may be accomplished within a separating chamber or drum of generous diameter but the completion of the centrifugal separating operation must be accomplished by a whirling movement which takes place within a separating chamber that is not much larger than the pipe which is required for the accommodation of the outgoing stream of purified fluid.

The petroleum vapor or other burdened carrier fluid passes successively through the primary and secondary portions of this separator, and the liquid and solid impurities, after being separated are centrifugally ejected from the path of the carrier fluid and are drained into parts of the separator which are shielded from violent agitation by the passing stream of fluid. Thus shielded the ejected susbtances are safely held while and until they are discharged from the separator. Meantime, re-entrainment is prevented and the carrier fluid (petroleum vapor in the case under discussion) is caused to be discharged in a highly purified state.

Due to the manner of its entrance the burdened fluid whirls within the upper part of the drum and it is there that the primary or bulk centrifugal separation of entrained substances takes place. The fluid leaves the drum axially. Obviously this main drum of the separator may be compared with a separator of the "Cyclone" type but it is to be noted that the body of the separator is very much smaller in relation to the diameter of the inlet pipe. This minimization of drum size is also made possible by limiting the exit or outlet of the separator, coupled with the safeguarding of that exit by the employment of a secondary separating unit therewith, directly within the drum. The advantages of the small diameter drum are unmistakable, it being apparent that, internal turbulence being avoided, the centrifugal separating force of such drum increases as its diameter is reduced; the cost is lessened; and, the separator is made to occupy less space. Further, the internal safeguarding of the exit results in reducing the height of the primary separating chamber as compared with former practices. These differences are also to be noted in comparing this invention with the so-called receiver separators which are commonly employed in steam lines. The volumetric capacity of the separator here disclosed is only a fraction of that of a receiver separator of equivalent operating capacity.

The present invention attains high efficiency by reason of these facts and because the fluid under treatment is everywhere held within close control and every separating operation takes place at high velocity. In brief, the commonly observed factors of time, distance of travel and velocity of discharge are disregarded and instead there is observed a new principle of restricting the diameters of the centrifugal separating elements. For operation of the kind depicted in Fig. 1, the diameter of the drum of this separator need not be more than three times the diameter of the pipe connections and obviously the secondary separating element is smaller than the drum and is of only slightly greater diameter than the outlet of the separator. And as pointed out the height of this separator is less than that of any other separator with which it may be compared.

Progressive movement of the fluid through the different parts of this separator is marked by slight loss of pressure. The method of discharging the separated substances varies with the character thereof. When the ejected substance is a liquid, as in the case under chief discussion, this invention unifies the liquid discharges from the different parts of the separator, employing the lower part of the separator as a cistern or well which is common to the several centrifugal parts of the separator. That cistern, however, is subdivided and employed in a manner which utilizes the collected liquid as a seal to effectively isolate the several parts of the separator, allowing each to function at its characteristic pressure, the liquid rising to different levels in different parts of the well, and thus automatically compensating the pressure differences. Both the general construction and the operations above described are well depicted in Figures 9 and 14. The difference between the centrifugal separators or purifiers of Figs. 9 and 14 is in the diameter and volumetric capacity of the two primary separating chambers. The lower parts of the separators may be regarded as of the same diameter and are identical in principle.

Figures 1 and 9 to 13, inclusive, present a good example of this invention as best adapted for employment in an atmospheric pressure petroleum distillation operation. In operations of that kind the output of the still is chiefly vapor and but little liquid remains for subsequent vaporization, the greater part of the liquid discharged by the still in such cases being matters which are unvaporizable at the ruling temperature, and therefore can be and should be promptly extracted from the vapor.

The separator illustrated in Figs. 2 and 14 to 17, inclusive, and in modified forms in Figs. 18 to 21, inclusive, is of the kind best adapted for employment where the offput of the still, as measured in pounds, is chiefly composed of hot liquid which vaporizes readily when released from the ruling pressure of the still. The greater diameter of the primary separating chamber provides for the vaporization or flashing of the hot liquid under a centrifugal control which both extends the disengagement surface of the liquid and positions the residual non-vaporizable liquid for safe ejection.

Once the vapor has been developed and is whirlingly present in the primary chamber (due to its tangential entrance) it is at once roughly clarified by the centrifugal effect of the whirling movement within the confining walls. Thus the greater part of the entrainment is immediately disposed of and in the form of liquid sinks or whirls downward upon the wall of the drum, collecting in the bottom thereof. The vapor thus treated, being displaced toward the axis of rotation by the peripherally entering products from the still, whirlingly collects about the axis of the primary chamber and flows toward the outlet from that region. It follows that only vapor which is substantially clean thus passes into and is subjected to the action of the smaller and centrally positioned internal separator or separators. It is there substantially freed of the remainder of entrainment and the resultant liquid, minor in quantity, is centrifugally ejected from the outgoing stream, also sinking to the bottom of the drum. The differing diameters of the primary separating chambers of the two types are incidental to the states in which the products of respective stills enter the separating chamber. As a rule, the denser the entering hot fluid, the greater should be the diameter of the primary chamber, to provide the better opportunity for the preparation of the vapor for final cleaning or purification within the smaller internal separator or separators.

Upon leaving the separator, the clean, "dry" vapor enters the before mentioned conduit or pipe $b^2$ for immediate distribution within the reception space of the tower B, and thence rises into the fractionating compartments of the tower. As clearly shown, the ejected liquid collects in the bottom of the separator and as shown at points marked $d$, is discharged through a drain which constitutes part of the described "liquid seal" at the bottom of the drum. In other words, the separator drain or discharge pipe first extends upward far enough to prevent the emptying of the drum by internal pressure upon the surface of the collected liquid. From that elevation the drain turns downward and is joined to any receptacle suitable to the highly heated liquid. Usually said drain leads into the base of the tower, as through a pipe $b^8$, to enable the stripping operation to be there performed, as described.

Referring again to Figs. 9 to 13, it will be seen that the body of the separator comprises a vertical cylindrical drum 2, closed at top and bottom by heads 3 and 4. The internal separator is centrally supported within the drum and to permit the removal of that part from time to time, the upper head of the drum is made detachable and removable. The part 5 represents one form of vapor-and-liquid inlet whereby the fluid is tangentially introduced into the upper or primary separating space or chamber 6 and thus caused to whirl therein. The part 7 is a centrally positioned vertical standpipe which extends through the bottom 4 and the upper end of which rises to about one-half of the height of the drum, there to co-act with the internal separating unit, said standpipe comprising the outlet of the separator. As in this case the product of this still is chiefly vapor and as the volume thereof is little increased by the flashing of liquid within the drum, the inlet 5 and the outlet 7 may be of substantially the same size. As will be apparent, the fluid enters and departs at high velocity and whirls with great vigor within the space or chamber 6, accomplishing the effects desired.

A horizontal floor section 8 is fixedly but detachably secured within the drum, being supported by spaced lugs 9 and secured by bolts 10. That plate is the foundation upon which the secondary separator is built. Before passing to the description of the secondary separator, attention is called to the fact that the horizontal floor 8 is of less diameter than the interior of the drum so that a narrow crack or slot 11 is provided between the edge of the floor and the inner surface of the drum. The liquid which is centrifugally separated from the vapor in the primary chamber is deposited against the inner wall thereof and is whirlingly driven downward through the circumferential slot 11, thence sinking to the bottom of the drum where it occupies a portion of the space $6^x$ surrounding the standpipe 7. Presently will be explained the sub-division of the space $6^x$ as required to utilize the liquid as a vapor seal between the several centrifugal departments of the separator.

In regard to the next step of the present process:—It is characteristic hereof that when the vapor has been centrifugally treated and cleaned in the relatively large primary separating chamber, whatever its kind, it is then and only then compacted or formed into a stream of much smaller cross-section and subjected to one or more stages of centrifugal clarification at higher vapor velocity. By that step the vapor is freed of the most minute particles which comprise the entrainment from the primary operation. In brief, the substantially clean vapor (taken from the central part of the primary chamber) moves toward and through the smaller secondary separator, which is a component part of the present invention. In entering said secondary chamber, the vapor impacts a plurality of so-called tuyère blades. Those blades perform two functions. First, they function as baffles, upon which many minute particles are deposited. Such deposit is attended by the aggregation of the particles so that when the deposited liquid is swept into the separator chamber the liquid is in larger drops and hence easier of disposition centrifugally. All of the tuyère blades are inclined in the same direction and the second function thereof is to whirlingly direct the flowing vapor into the separating chamber. In that chamber and one or more succeeding races, and as a result of the very rapid whirling motion of the vapor, the impurities are centrifugally separated and are discharged from the stream of vapor, permitting only clean vapor to leave the secondary or high speed separator. The characteristics here explained will be observed in the secondary separators or vapor refining units of all of the types disclosed herein; for example, in Figs. 9, 14, 20 and 21.

The mid-height floor section 8 shown in Fig. 9 is positioned above the standpipe 7 and supports the secondary separating chamber 12, the actual opening in the floor 8 and the chamber 12 being co-axial with the standpipe 7. It is to be noted that the chamber 12 is but little larger than the standpipe 7 which forms the vapor outlet. Obviously the outgoing vapor stream is here compacted, in consonance with the principle above defined.

The upper or inlet end of the chamber 12 is characterized by a whirl-promoting tuyère, that tuyère being made up of a plurality of inclined radial blades $12^a$, all having the same direction and radiating from a central blank or hub $12^b$. The aggregate area of the many tangential tuyère passages thus formed approximately equals and best exceeds the area of the separator outlet 7.

The roughly clarified vapor from the central part of the primary chamber 6 passes swiftly through the whirl-producing tuyère and thus is caused to spirally rotate with great rapidity within the relatively small chamber 12. In consequence of such rotation and while in spiral movement toward the underlying outlet, the most minute impurities are aggregated and also centrifugally deposited upon the inner wall $12^x$ of the chamber, and spiral downward thereon. The impurities are received and momentarily collected within a race 13 which is formed by the lower end of the chamber 12 in conjunction with an abrupt, annular race floor 14. By preference, the race portion of the chamber 12 is distended, thereby forming a capacious circumferential groove or race for the better retention of the whirling liquids. The lower edge of the chamber 12 is separated slightly from the floor 14, thus forming a narrow circumferential crack or discharge slot $13^x$; and the centrifugal forces, accentuated by the presence of the race floor 14, act to positively eject or discharge the liquid through the slot $13^x$. The latter is in open communication with the upper part of the beforementioned liquid collecting space $6^x$.

In the exemplary separator illustrated in Fig. 9, means are provided for further cleaning the vapors which leave the chamber 12; that is, a second separating element or unit, marked 12', is positioned directly below the first unit; between the same and the top of the standpipe 7. The second unit is substantially identical with the first, being equipped with the characteristic radial tuyère blades $12^{a'}$ and hub $12^{b'}$. Further, the lower end of the chamber 12 contains a like race or groove 13'. A difference is found in the internal diameter of the race floor portion 14' which, in the case of the second unit, is lodged upon the top of the standpipe 7, and is preferably of smaller diameter than the separating chambers 12 and 12'. The substances collected in the second race 13' are ejected into the space $6^x$ through the circumferential race slot $13^y$.

Attention is now called to the parts which in Fig. 9 are marked 15, $15^a$ and $15^b$. These are so-called vortex-defeating cones and are of great importance because enabling the separation of the most minute impurities from the vapor. The function thereof is to intercept stray quantities of fine impurities which would otherwise reach and depart along the axis of the whirling bodies of vapor, and after intercepting the same, to hold them momentarily until sufficient masses are accumulated to be whirlingly detached by the force of the whirling vapor and to be thereby flung against the walls of the separating chamber. One such vortex-defeating cone or concavity is provided for each unit of the separator, as well shown in Fig. 9, the same in each case opening toward the vapor outlet. Being in each case positioned within the downgoing or axial portion of the vortex or whirling body of vapor, the conical or concave part described as a vortex-defeating cone, accentuates a partial void in and near the axis of that portion of the vortex distant from the outlet. Any inwardly displaced and intercepted liquid particles lodge upon the inner margin of the concavity and are there held under the influence of the whirling vapor, that is, in the presence of the underlying and rapidly whirling portion of the vortex. As they accumulate and are set into rotation through that influence, they are detached by the centrifugal forces developed by such rotation, and being thereby expelled from the axial portion of the vortex are prevented from reaching the outlet.

It is to be noted that the separator unit 12' is incorporated with a part 8' which corresponds to the described floor 8 but is of smaller diameter and is equipped with spacing lugs 8''. Attention now reverts to the different pressures at which the separated liquids are discharged from the several separating units. Obviously, the pressure at the base of the primary separating chamber 6 must somewhat exceed the pressure at the base of the refining element or unit 12 and in turn, the pressure at the base of the unit 12' is still lower.

These differences are never great but if all of the narrow slots 11, 13$^x$ and 13$^y$ were left in open communication with a single liquid space, some vapor and perhaps liquid would short circuit through the lower-pressure discharge slots 13$^x$ and 13$^y$. Re-entrainment of liquid would result and it is therefore necessary to prevent such action. For this reason the space 6$^x$ is sub-divided, as by means of the cylindrical skirts or walls 16 and 17 which hang from the floors 8 and 8' respectively. The joints between these skirts and floor portions are made tight and incidentally the separating unit 12' is rigidly supported above the race floor 14' by the skirt 16, as through the medium of bolts 17' which pass through the skirt 16 and are threaded into the lugs 8'' belonging to the floor portion of the unit 12'. The lower ends of the skirts 16 and 17 are spaced from the drum bottom 4 and as shown in Fig. 9, are submerged in a small body of liquid, held in the bottom of the drum. Thereby the herein-before described vapor seal is completed by the several skirts of the separator, allowing each centrifugal separating unit to function without disturbance from the others. The drain $b^8$ opens downward from the bottom of the drum and thence rises, as required to provide a pressure-compensating column $d$ which serves to retain a desired quantity of liquid within the bottom of the drum, as before described.

Most conveniently, the upper floor 8 is provided with I-bolts or loops 18 whereby, when the cover 3 has been removed and the fastenings 10 loosened, the refining units 12 and 12', together with the skirt portions 16 to 17, may be lifted out of the drum, or lowered into the same.

In principle, the multiple stage separator of Fig. 14 is identical with that of Fig. 9. But the form of the outer casing or drum is changed to suit such uses as are represented in Figs. 2 to 8, inclusive. In those instances the operation is conducted under conditions which occasion a wide difference of pressure between the outlet $a^2$ of the still and the vapor reception space or apparatus.

In the case represented by Figs. 2 and 3 the product of the still A is chiefly composed of liquid or extremely dense vapor which may be regarded as a liquid, which by reason of its higher pressure and temperature is freely vaporizable provided the liquid be promptly released within an expansion space capable of permitting the swift departure of the expanded vapor. It is usual in such cases to join the outlet $a^2$ of the still directly to the reception space B' of the tower, and expansion within that space is depended upon for the free vaporization of the oil and also for the precipitation of substances which are unvaporizable at the ruling pressure and temperature. In contrast, I interpose in the line $a^2$—$b^2$ a multiple stage centrifugal purifier which is characterized by a primary separating chamber of sufficient size to permit the "flashing" or free evaporation of the hot liquid and progressively to ensure the described purification of the resultant vapor, before permitting discharge into the reception space B' through the leader or tower inlet $b^2$. The detailed construction best appears in Figs. 14 to 17.

The lower part 2$^a$ of the separator drum of Fig. 14 may be a relatively small cylinder, like the lower part of the separator shown in Fig. 9. For sake of brevity the internal parts of Fig. 14 are identified by the reference marks made familiar by Fig. 9; they operate in the same manner and require no further description. It will be noted, however, that Fig. 14 shows only a single internal separating unit 12; though obviously, two or more may be employed in series, above the standpipe 7. The upper part of the drum of Fig. 14 is made much larger in diameter, to afford space and time for the flashing or evaporation of the hot oil which enters at high velocity through the tangential inlet 5$^a$. Such evolution of vapor is very rapid and the enlarged primary separating chamber 6$^a$ is filled by a vortex or body of vapor whirling therein at high velocity. Essentially the upper part of the drum constitutes a capacious vapor race 6$^b$, within which the liquid and the vapor are maintained in a state of exposure and rotation, respectively, long enough to permit the conversion of the greater part of the liquid into vapor before it must be refined as described for ultimate use.

Rapid rotation against the inner wall surfaces has the effect of widely spreading the liquid thereon, thus facilitating the disengagement of the evolved vapor and preventing the discharge of the liquid until after vaporization has taken place. Indeed, this construction contains the solution of the problem of finding a way in which the evolution of vapor may take place while the evolved vapor is undergoing centrifugal purification. Further, the centrifugal purification obviously has the effect of returning the separated drops and particles to admixture with the freshly entering hot liquid in its state of distribution on the race surfaces, thus better ensuring the liberation of all available vapor. By thus evaporating the liquid under close centrifugal control I again accomplish within a small space all that has hitherto been performed within the great reception spaces of fractionating towers operated under vacuum.

A further problem answered by the mushroomed or race-containing expanded top of this combined evaporator and purifier relates to the retention of the vaporizable liquid within an intensified zone of rapidly whirling vapor for an extended time. This is accomplished by an extensive race portion of relatively small height or axial extent; and, in addition the liquid is prevented from at once sinking to the bottom of the drum. If permitted, that action would result in slowing down the described vaporization and also result in the discharge of liquid which would vaporize to an objectionable extent when drained into the base of the fractionating tower. The foregoing explains the expanded form or cross-section of upper parts of the separators, shown in Figs. 14 to 21. By preference, said upper part is of substantially V-shaped cross-section, being formed by the convergence of the outwardly flaring portion 2$^b$, the cylindrical portion 2$^c$ and the top portion 2$^d$.

The propulsion of the vapors whirling within the chamber 6$^a$ serves to rotatively expel the residue of liquid upon the inner walls of the race 6$^b$ and it is only when practically all the liquid has been quite completely evaporated that the residue is displaced inwardly upon the floor 2$^b$ of the chamber 6$^a$, thus reaching the discharge slot 11 to sink into the collection space 6ˣ. Importantly, the inwardly and downwardly pitched floor portion 2ᵇ of the primary separating chamber 6ᵃ serves to surely though slowly discharge the residual liquid, while preventing liquid accumulations which might become bodies of coke.

All vapors generated and centrifugally cleaned within the extensive primary chamber 6ᵃ, pass axially therefrom and are finally refined within the internal separator before being discharged through the standpipe 7 or other vapor outlet. The small remainder of liquid centrifugally separated and collected in the separator 12 is discharged into the underlying space 6ˣ through a slot 13ˣ, as before explained.

Most conveniently, the top of the separator of Fig. 14 is provided with a removable cover plate 3ᵃ so that the parts 12, 8 and 16 may be withdrawn from the separator when necessary, as for purposes of inspection and repair.

But one other part of Fig. 14 remains to be described, to-wit, the vortex-defeating element or cone 15'. By preference, this is a downwardly and outwardly flaring flange incorporated with the ring part 3ᵇ belonging to the cover plate. The vortexial action of the vapors whirling within the space 6ᵃ tends to sweep some of the liquid upward within the race 6ᵇ and the function of the conical part 15' is to intercept and return such liquid to the peripheral part of the race 6ᵇ, in the manner before explained, thus preventing liquid from being drawn into the axial portion of the vortex. In other words, the vortex defeating element in the top of the primary chamber 6ᵃ defends the vapor outlet of the chamber 6ᵃ, preventing the overburdening of the secondary or internal separator 12. Clearly, the action of the separator 12 should be and is limited to the removal of a minor percentage of impurities.

The foregoing description of Fig. 14 serves as a detailed explanation of the before-mentioned added step in the process claimed, said step consisting in the development and rough cleaning of the vapor before it is permitted to enter the final vapor refining stage of the process.

Obviously, such added step of the process could be performed within a cylindrical container or drum of suitably enlarged diameter but marked advantages flow from the relatively long centrifugal retention of the evaporating liquid in direct exposure to the hottest of the whirling vapors. In every case requiring the development of the major part of the vapor after the products leave the still, the distended separator top is to be preferred over any other form for the drum.

Figures 18 and 20 are relied upon to show that the invention is not restricted to the particular form of separator top shown in Fig. 14. A simplified form may comprise conically symmetrical top and floor portions 20 and 21 joined by a narrow cylindrical portion 22, the same constituting an effective evaporating race 6ᵇ. The drum structure of Figs. 18 and 20 will be preferred by many because of its simplicity and low cost. It is particularly adapted to low pressure usage.

By preference, all of these evaporating heads are internally provided with removable, circumferential wear-plates 23, the abrasive and corrosive actions of the inrushing hot liquid being considerable.

Fig. 18 may best be compared with Figs. 9 and 14 inasmuch as all are characterized by downwardly extending standpipes and because the disposition of the liquid seal is the same throughout. Fig. 20 is distinguished by a vapor outlet 24 which extends upward from the top of the separator and the liquid seal at the bottom of the separator is arranged in a different manner. In the structures of Figs. 18 and 20 the internal or secondary separator is characterized by a whirl-promoting tuyère of the barrel type to the end that it may be contrasted with the radially bladed tuyère previously described.

At this point it may be remarked that where the outlet of the separator is necessarily large by reason of the great volume of vapor to be discharged, it is well to substitute a separator of the type shown in Figs. 18 and 20 for the radially tuyèred separator of Figs. 9 and 14. As a matter of further contrast, it is to be noted that in Figs. 18 and 20 the secondary separator occupies the upper central part instead of the lower central part of the primary separating chamber. That arrangement has obvious advantages and is rendered preferable by the extensive vapor approach area of the barrel-type tuyère, as compared with the radially bladed tuyère.

Attention is called to Fig. 21 which may be read in connection with both Fig. 18 and Fig. 20. The barrel-type tuyère above referred to, in addition to top and bottom plates or rings, comprises a circumferential series of inclined or tangential blades 25, forming an equally large number of relatively overlapping slot-like tuyère openings 26 all having the same direction and all of which communicate with the internal cylindrical space or separating chamber 27, existing within the annular arrangement of blades. The diameter of that space 27 is somewhat larger than the diameter of the outlet of the separator to afford both entrance and separating spaces in advance of the said outlet. The barrel tuyère and said outlet are coaxial, as well shown in Figs. 18 and 20 and as indicated by the dotted line 28 in Fig. 21.

In the case of Fig. 18 the top of the tuyère is formed by the cover plate 29, while the bottom of the tuyère is formed by a ring 30. A vortex-defeating cone 31 (like unto the cone 15' of Fig. 14) occupies the upper central part of the primary chamber 6ᵃ; and a smaller vortex cone 15ʸ occupies the upper central part of the tuyère chamber 27, directly above but spaced from the outlet 32, each said cone serving the already described purposes with reference to its respective separator outlet.

16ᵃ and 17ᵃ (Fig. 18) are skirt portions which extend downward from the lower part of the separator to divide the space 6ˣ as before described and thus complete the liquid seal in the lower part of the separator. The top of the skirt 16ᵃ is tightly jointed to the ring 30. The skirt 17ᵃ is supported on the part 16ᵃ, as by spacer blocks 33. The top of the standpipe is spaced below the ring 30 and the top of the skirt 17 is spaced intermediately, the arrangement being such that the major part of the liquid which is separated within the barrel-shaped tuyère is centrifugally deposited in the immediately underlying race 34 and descends in the space between the skirts 16ᵃ and 17ᵃ. A minor part of the separated substance is collected in the second and somewhat lower race 35, and descends within the space between the standpipe 22 and the skirt 17ᵃ.

As before explained, the liquid must be kept in motion within the bottom of the separator and is so moved by the force of the vapor always whirling in the compartments of the space 6ˣ.

But too violent agitation of the liquid is to be prevented. This precaution is effected by parts 36, 37 and 38. The first occupies the space between the drum portion 2ᶜ and the skirt 16ᵃ limiting communication to a narrow slot 39. The parts 37 and 38 are best shown in Fig. 19 where it will be seen that they form inclined floors for respective collecting races 34 and 35. These floors are spaced from respective parts 34' and 35' forming the now familiar narrow liquid discharge slots 37' and 38'. By so limiting communication between the upper and lower parts of the separator the operation is made ideal, the quantity of vapor flowing into the lower or cistern part being too small to entrain liquid or too greatly disturb the surface of the liquid seal.

The barrel-type tuyère of Fig. 20 is characterized by a cover plate 40 which contains the smaller central vapor outlet 24, and forming an overhanging annular abutment 41, between the outlet 24 and the blades 25. The lower end of the tuyère comprises the ring 42 which has a depending bowl-forming portion or wall 42'. The collecting bowl is completed by a bottom part 43 and that part is separated from the part 42' by the narrow circumferential slot 44. The part 43 is supported by the skirt 16ᶜ, as shown. Supported within the bowl portion of this separator is a vortex-defeating cone 15ᶻ adapted to perform the now familiar function with respect to the outlet 24.

The skirt 16ᶜ of Fig. 20 hangs from the ring 42 and extends nearly to the bottom of the constricted portion 6ʸ of the separator. Due to the employment of the compensating loop 46, the separator bottom always contains a quantity of liquid 45 in which the lower end of the skirt 16ᶜ is immersed, thus completing the seal between the primary and secondary separators. That loop 46 provides the exit for the accumulating liquid. An encircling collar or flange 16ᵍ, preferably applied to the skirt 16ᶜ, limits communication between the primary separating space 6ᵃ and the lower part of the separator, in the now familiar manner.

The complete operation of the separators shown in Figs. 18 and 20 will be apparent from the foregoing and the description of Fig. 14.

Any and all of the multiple stage centrifugal separators herein described operate in consonance with the herein described process of purifying petroleum vapors and the like for fractionation or similar treatment. Because of the qualities which adapt them to such exacting uses, they are admirably suited to many other uses, many of which will at once suggest themselves to those skilled in the arts requiring such operations upon different fluids. Some added uses are indicated in Figs. 4 to 8.

The part 48 appearing in Fig. 4 represents the so-called soaking drum which is characteristic of certain oil cracking processes. In the present case, a combined evaporator and vapor purifier 49, of either of the described constructions, is interposed between the soaking drum 48 and the vapor reception space of the fractionating tower. This separator 49 obviously serves as a flash chamber; in such cases operating at a pressure much lower than that maintained in the soaking drum 48. It affords the advantage of delivering only clean vapor to the fractionating tower.

In Fig. 5, I have illustrated the interposition of an evaporator purifier 50 between the vapor outlet of the still and the so-called fired soaking coil 51, in which a cracking operation is performed. It is highly desirable that that coil be kept clean and this insures a supply of clean, heavy vapor for utilization in the coil 51, the separated residue passing into the tower through the pipe b⁸'. The outlet 51' of the soaking coil 51 contains a suitable reducing valve and is joined to the vapor inlet b² belonging to the tower.

Still another arrangement is shown in Fig. 6 wherein two of the described evaporator-separators are employed, the one serving as a soaking drum 52 and the other as a flash chamber 53, in advance of the tower.

In Fig. 7 I have illustrated a novel process of evaporating sugar juices or like waters. The liquid to be treated is first passed through a heating chamber 58 and thence flows through the fired coil 59, in a suitable furnace. In the coil the liquid is raised to high pressure and temperature and is then tangentially discharged into the separator 56. A high degree of vaporization is accomplished therein in the manner described and because a considerable vacuum is maintained in the vapor outlet 56' belonging thereto. The outlet conduit 56' delivers the resultant steam to a heat interchanger 58 and the residue of vapor passes into a condenser 60. The liquid product of the separator 56 is pumped through a seal 61 and enters a second heated coil 62 where it is raised to a higher temperature and is delivered to the second separator 57. The steam from the latter is conducted by the pipe 61 and after passing through the heat exchanger is delivered to the condenser 60, or to a separate condenser where available. The liquid from the separator 57 passes through a seal 62 and is delivered to a syrup trough 63. Economy and capacity of equipment and efficiency are apparent in the arrangement of Fig. 7.

A somewhat simpler arrangement is illustrated in Fig. 8 for such uses as the distillation of salt water. The parts may be briefly identified as follows: 64 is a convenient heat exchanger. A pump 65 serves to deliver the feed water through the exchanger and to the water heating coil 66 of the furnace 67. The hot liquid leaves the coil through a pressure-maintaining valve 68 and is then immediately liberated within the evaporator-purifier 69, the latter being of the construction hereinbefore described. Most conveniently, the clean steam which is generated passes through the heat exchanger, thence to a condenser 70 from which it is taken by a pump 71 and delivered to a storage tank 72. The unvaporized salt water leaves the bottom of the separator 69 by way of the seal 73 and after passing through the heat exchanger, is discharged as by a pump 74. The latter is desirable because the separator works under vacuum by reason of the employment of the condenser 70.

The arrangement of Fig. 8 has the advantage of being continuous in operation, both the distillate and the waste waters being discharged constantly. It has the further advantage that the evaporator-separator is self-cleaning as before explained and it is unnecessary to interrupt the operation for the purpose of removing salts. It is not attempted to discharge dry salts from the bottom of the separator but merely a heavily concentrated waste water, the heat of which may be saved in the heat exchanger. Obviously, the arrangement of Fig. 8 is capable of many other uses.

These multiple stage centrifugal separators can be adapted to the collection of dry dusts by merely segregating the several compartments of the collecting space 6ˣ and providing a capacious drain opening for each compartment.

I claim:

The herein described multi-stage improvement in the art of fractionation, which consists in continuously heating supplied liquid, releasing the hot liquid and accompanying vapor in a vapor release zone and permitting the vaporization of that residue of liquid which will vaporize at the ruling temperature and pressure, employing and directing the progressive force of the evolved vapor to centrifugally separate therefrom unvaporized liquid and discharging the separated liquid, again employing the residual force of the progressing vapor while still within said vapor release zone to centrifugally separate from and within the central portion of the body of initially evolved vapor a residue of unvaporized liquid and discharging that liquid, thereby conserving heat and maintaining the temperature of the total of cleansed vapor, and, then subjecting the cleansed vapor to progressive condensation or fractionation.

CHARLES GILBERT HAWLEY.